H. OPPERMAN & A. BLACK.
Hoisting Apparatus.

No. 158,970. Patented Jan. 19, 1875.

WITNESSES:
W. W. Hollingsworth
Solon C. Kemon

INVENTOR:
Henry Opperman
Alexander Black
BY
ATTORNEYS.

UNITED STATES PATENT OFFICE.

HENRY OPPERMAN AND ALEXANDER BLACK, OF STEUBENVILLE, OHIO.

IMPROVEMENT IN HOISTING APPARATUS.

Specification forming part of Letters Patent No. 158,970, dated January 19, 1875; application filed December 2, 1874.

*To all whom it may concern:*

Be it known that we, HENRY OPPERMAN and ALEXANDER BLACK, of Steubenville, in the county of Jefferson and State of Ohio, have invented a new and Improved Safety-Catch for Elevating Carriages; and we do hereby declare that the following is a full, clear, and exact description of the same, reference being had to the accompanying drawing, forming a part of this specification, in which—

Figure 1:
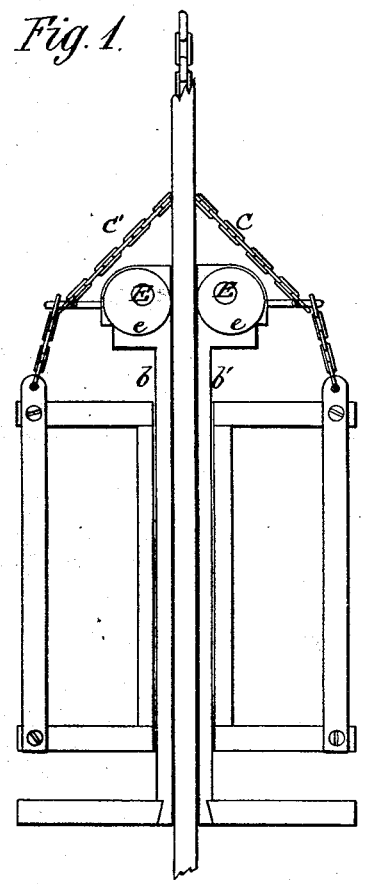
Figure 2:
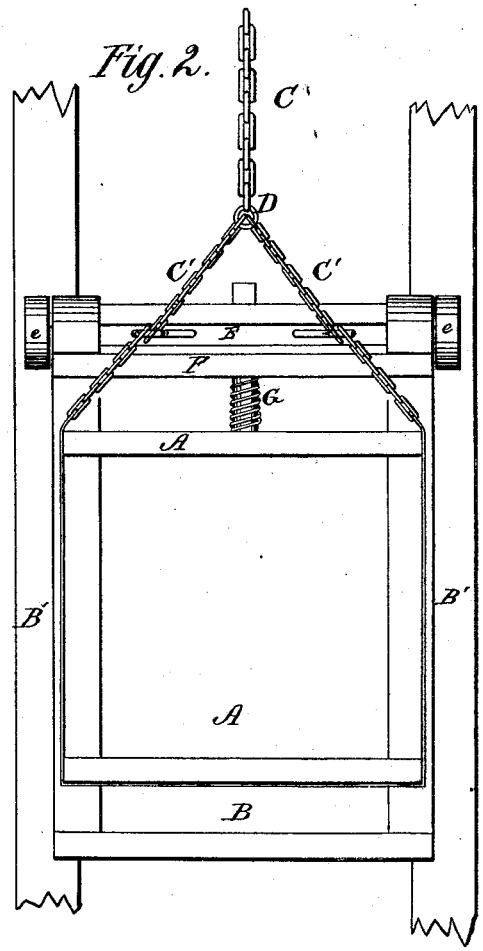
Figure 3:
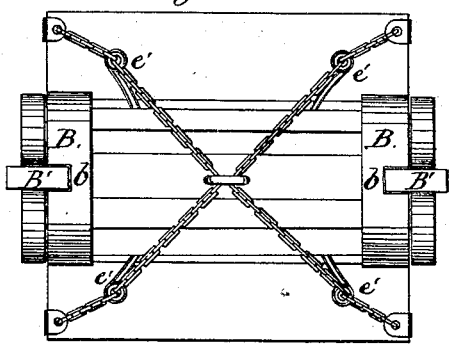

Figure 1 is a vertical section; Fig. 2, a front elevation; Fig. 3, a horizontal section.

Our invention relates to the cages in which men and materials are transferred to and from the inside of a mine, the object being to provide a safety attachment by which danger from the breakage of a rope or other part of the holding device will be surely and effectually prevented.

A represents the cage, and B the frame in which it is located, the latter being provided with guide-grooves $b$ $b$, that work over corresponding fixed guides B' as the cage is hoisted or lowered. We make the cage A independent of, and to slide in, the sliding frame B by means of the grooves, which receive and work on the uprights $b'$ $b'$. C is a chain or rope fastened centrally to the top $a'$ of the cage, and C' C' lateral chains or ropes attached at one end to each side of said top, the upper ends of all three ropes being connected with a common ring, D, to which is affixed the lifting-rope. E E are rock-shafts, having at each end a cam, $e$, and in or near the middle an arm, $e'$, to which one of the side ropes C' is tied.

The operation is as follows: When force is applied to the drawing rope, chain, or other flexible connection, the cage first rises to a superposed cross-bar, F, turns the cams out from the guides of frame, and allows the whole to move together. If, during the operation, the lifting-rope should slack or break, the weight of cage and its contents, which may be accelerated by the use of a spring, G, if desired, causes it to slide down toward the bottom of frame, turning the cams $e$ $e$ of each pair toward each other, so as to clamp the guide-posts. The frame is thus arrested and held while the damage is being repaired or remedied, and all chance of a serious accident thereby entirely prevented.

Having thus described our invention, what we claim as new is—

The means described for causing the cams $e$ $e$ to clamp the guides of frame, consisting of a cage, B, sliding within frame A, the ropes C C' C', and the rock-shafts E E, having arms $e'$ $e'$, as shown and described.

HENRY OPPERMAN.

ALEXANDER + BLACK.
<sup>his</sup> <sup>mark.</sup>

Witnesses:
SOLON C. KEMON,
CHAS. A. PETTIT.